Patented Feb. 22, 1949

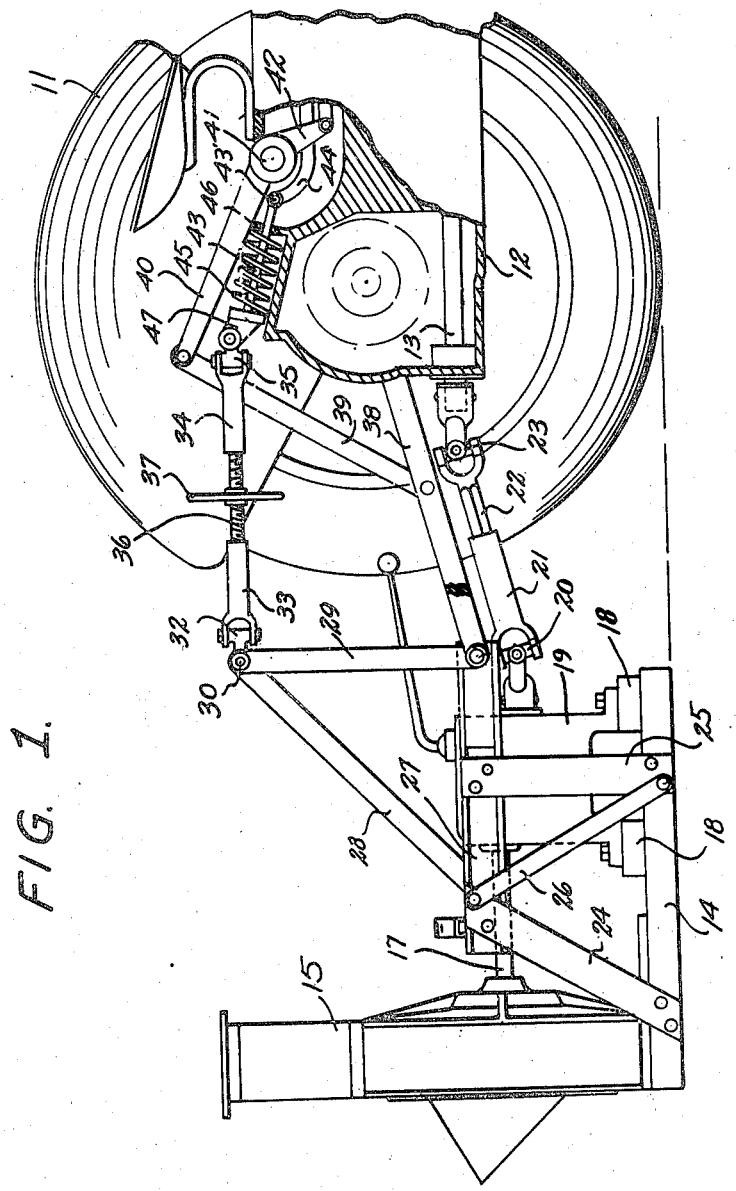

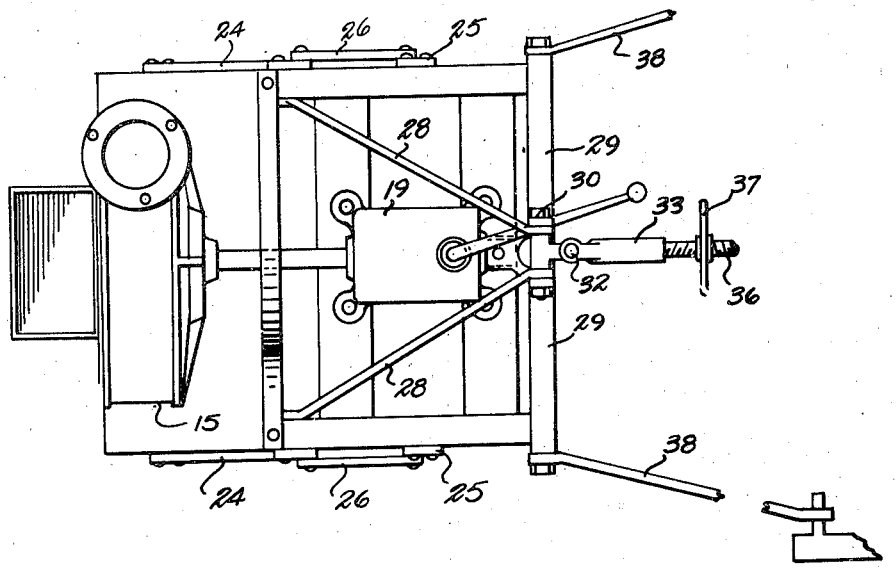
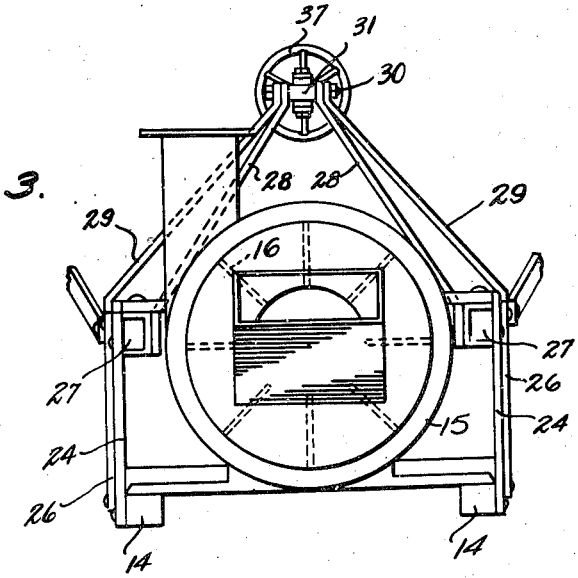

2,462,588

UNITED STATES PATENT OFFICE 2,462,588

GRAIN BLOWER DRIVE MECHANISM

Edward J. Wondra, Mayville, Wis.

Application June 6, 1947, Serial No. 753,136

1 Claim. (Cl. 230—39)

This invention relates to grain blowers, and more particularly to means for driving a grain blower from the power take-off shaft of a tractor.

A main object of the invention is to provide a novel and improved grain blower mechanism adapted to be operated from the power take-off shaft of a tractor, said mechanism being very simple in structure, easy to set up for operation and efficient in performance.

A further object of the invention is to provide an improved grain blower attachment for tractors which is inexpensive to manufacture, sturdy in construction and reliable in operation.

Further objects and advantages of the invention will become apparent from the following description and claims, and from the accompanying drawings, wherein:

Figure 1 is a side elevational view of a grain blower mechanism constructed in accordance with the present invention and shown operatively connected to the power take-off shaft of a tractor.

Figure 2 is a top plan view of the grain blower mechanism of Figure 1.

Figure 3 is an end elevational view of the grain blower mechanism of Figure 1.

Referring to the drawings, 11 designates the rear portion of a conventional tractor, said rear portion having a rear axle housing 12 through the rear end wall of which rotatively extends the power take-off shaft 13. The blower mechanism comprises a pair of longitudinal bottom supports 14, 14 to the rear end portions of which is secured a blower housing 15 in which is journaled a multi-bladed rotor 16. The rotor shaft is shown at 17. Secured to the forward portions of longitudinal supports 14, 14 are spaced transverse supports 18, 18 on which is mounted a transmission unit 19 which is similar to a conventional automobile transmission. Rotor shaft 17 is connected to the transmission unit as the driven shaft thereof. The driving shaft of the transmission unit is connected by a universal joint 20 to a sleeve member 21 having a noncircular axial bore formed therein, such as a square bore, and slidable in said bore is a correspondingly shaped shaft element 22 connected to the end of the power take-off shaft 13 by a universal joint 23. Blower shaft 17 may thus be driven by take-off shaft 13, acting through the transmission 19, universal joint 20, sleeve 21, slidable shaft element 22 and universal joint 23 in a large number of depressed angled or elevated positions with respect to the take-off shaft 13.

Secured to the outer side portions of the respective supports 14, 14 are upstanding pairs of post members 24 and 25 and at each side of the frame structure thus defined is connected a diagonal brace bar 26. Secured to the top ends of the respective pairs of post members 24 and 25 are respective longitudinal beam members 27, 27. Rigidly connected to the rear portions of the respective beam members 27, 27 are convergent upwardly inclined bar members 28, 28 and rigidly secured to the forward portions of said beam members are upstanding convergent bar members 29, 29. A transverse bolt 30 connects together the top ends of the bar members 28, 28 and 29, 29. A sleeve member 31 is rotatably mounted on said bolt 30 between the top ends of the inner bar members 29, 29. Sleeve member 31 carries a vertical pivot pin 32, to which is pivotally connected a longitudinally extending internally threaded sleeve 33. A similar sleeve 34 is connected by structure to be presently described to the frame of tractor 14. The threads in one of the sleeves are right-handed and the threads in the other sleeve are left-handed. A stud member 36 suitably threaded with opposite threads at each end portion is threadedly received in the respective sleeves 33 and 34. Stud member 36 carries a hand wheel 37 at its midportion for rotating said stud member, to thereby vary the length of the connecting link defined by the sleeves 33, 34 and said stud member.

The ends of beam members 27, 27 adjacent the tractor are connected to the frame of the tractor by respective pivotal link bars 38, 38. Connected pivotally to the intermediate portion of each link bar 38 is the lower end of a link 39, the upper ends of the links 39 being pivotally connected to the ends of levers 40 pivotally mounted on a transverse shaft 41 carried by the tractor frame. Each lever 40 has an actuating arm 42 connected to the plunger of the hydraulic lift apparatus of the tractor, so that when the hydraulic lift apparatus is actuated, levers 40 are rotated clockwise. as viewed in Figure 1, raising the link bars 38, 38 and lifting the blower frame off the ground for transportation by the tractor.

A yieldable connection is provided for securing the sleeve 34 to the tractor frame, whereby the adjustable top link member defined by sleeves 33, 34 and stud 36 will not interfere with the raising of the blower frame by the hydraulic apparatus. As shown in Figure 1, sleeve 34 is connected to an abutment member 47 by a universal joint 35. Secured to abutment member 47 is a rod 43 which passes slidably through an abutment element 46 upstanding from the top of housing 12. The rod 43 carries at its free end a laterally projecting lug 43' which is slidably engaged in an arcuate slot 44 found in an adjacent fixed portion of the tractor frame. A spring 45 encircles rod 43 and bears between the fixed abutment 46 carried by the tractor frame, and through which rod 43 passes, and the movable abutment 47 connected to universal joint 35 and to which the rod 43 is connected.

In operation, the blower is carried by the tractor to its desired location and is lowered to the ground. The blower is driven by the tractor engine by the above described connection of the blower mechanism to the tractor power take-off shaft 13. The speed of the blower may be regulated by means of the gear shifting mechanism of the transmission unit 19, and if required, said blower may be operated in reverse by employing the reversing gears of said transmission unit.

The slidable connection of squared shaft 22 in sleeve member 21 allows the blower to be angled freely with respect to the tractor frame by means of the hydraulic lift mechanism or by the hand wheel 37 in adjusting the operating position of the blower. If so desired, the blower may be operated while in elevated position or while the tractor is moving.

While a specific embodiment of a grain blower attachment for tractors has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

The combination with a tractor having a frame, a power take-off shaft, and a hydraulic lift mechanism, of a grain blower attachment mounted on the rear of said tractor, said attachment comprising a supporting frame, a blower unit including a rotor mounted on said supporting frame, a speed-changing transmission unit mounted on said supporting frame intermediate the tractor and said blower unit, means connecting the driven shaft of the transmission unit to the blower rotor, shaft means, means connecting the ends of the shaft means respectively to the driving shaft of the transmission unit and to the power take-off shaft of the tractor for universal pivotal movement, said shaft means comprising a sleeve member and a rod member telescopically and non-rotatably received in said sleeve member to permit axial movement of said rod relative to said sleeve, means yieldably connecting the upper portion of said supporting frame to the frame of the tractor and including means for adjusting the angular position of said supporting frame, and means operatively connected to the hydraulic lift mechanism of the tractor for adjusting the vertical position of said supporting frame for elevating the latter during the transportation of said grain blower attachment.

EDWARD J. WONDRA.

REFERENCES CITED

The following references are of record in the file of this patent:

UNITED STATES PATENTS

| Number | Name | Date |
|---|---|---|
| 1,742,948 | Carlson | Jan. 7, 1930 |
| 1,904,832 | Knapp | Apr. 18, 1933 |
| 1,961,809 | Wood | June 5, 1934 |
| 2,309,750 | Carrington | Feb. 2, 1943 |
| 2,335,510 | Hansen | Nov. 30, 1943 |
| 2,339,689 | Englund | Jan. 18, 1944 |
| 2,350,880 | Dellinger | June 6, 1944 |